United States Patent [19]

Speicher et al.

[11] Patent Number: 5,505,408
[45] Date of Patent: Apr. 9, 1996

[54] DIFFERENTIAL YOKE-AEROFIN THRUST VECTOR CONTROL SYSTEM

[75] Inventors: John M. Speicher; Allan A. Voigt; Che-Ram S. Voigt, all of Geyserville, Calif.

[73] Assignee: Versatron Corporation, Healdsburg, Calif.

[21] Appl. No.: 139,939

[22] Filed: Oct. 19, 1993

[51] Int. Cl.⁶ .............................. F41G 7/00; B64C 15/02
[52] U.S. Cl. .................... 244/52; 244/3.22; 244/3.24; 244/73 R; 244/76 J; 239/265.35; 60/232; 74/89.18
[58] Field of Search .................... 244/169, 3.22, 244/3.23, 3.24, 3.29, 52, 73 R, 76 J; 239/265.35; 60/232; 74/89.18, 89.19

[56]  References Cited

U.S. PATENT DOCUMENTS

| | | | |
|---|---|---|---|
| 2,704,331 | 3/1955 | Stott et al. | 74/55 |
| 2,850,977 | 9/1958 | Pollack | 244/3.22 |
| 2,919,544 | 1/1960 | Smith, Jr. et al. | |
| 3,073,630 | 1/1963 | Kuhn, Jr. | |
| 3,142,153 | 7/1964 | Hensley. | |
| 3,147,591 | 9/1964 | McEwen | 60/35.55 |
| 3,165,889 | 1/1965 | Kershner et al. | |
| 3,188,024 | 6/1965 | Schneider | 244/52 |
| 3,200,586 | 8/1965 | Ernest. | |
| 3,200,587 | 8/1965 | Tolson | 60/35.55 |
| 3,237,890 | 3/1966 | Thielman | 239/265.35 |
| 3,659,423 | 5/1972 | Lair et al. | 60/35.55 |
| 3,908,908 | 9/1975 | Johnson | 60/232 |
| 4,029,270 | 6/1977 | Niemeier | 244/3.21 |
| 4,272,040 | 6/1981 | Bastian et al. | 244/3.22 |
| 4,281,795 | 8/1981 | Schweikl | 60/232 |
| 4,350,297 | 9/1982 | Martin | 239/265.35 |
| 4,463,921 | 8/1984 | Metz | 244/3.22 |
| 4,560,121 | 12/1985 | Terp | 244/3.22 |
| 4,892,253 | 1/1990 | Speicher et al. | 239/265.35 |
| 4,913,379 | 4/1990 | Kubota et al. | 244/52 |
| 5,123,611 | 6/1992 | Morgand | 244/3.22 |

FOREIGN PATENT DOCUMENTS 2113628  8/1983  United Kingdom.

*Primary Examiner*—Andres Kashnikow
*Assistant Examiner*—Virna Lissi Mojica
*Attorney, Agent, or Firm*—Henry M. Bissell

[57]  ABSTRACT

An actuation system for controlling the steerable nozzle of a missile or like vehicle is combined with an aerofin control system, both of which are driven in unison by associated drive motors and gear assemblies, one set for each aerofin. The nozzle steering system comprises two essentially identical yoke plates mounted along a plane generally transverse to the missile axis and oriented orthogonally relative to each other about the missile axis for pivoting the nozzle through mutually orthogonal axes, thereby achieving omni-directional steering. The yoke plates are coupled at opposite ends to pinion gears which are driven by the same gear assemblies which drive the associated aerofins. The arrangement permits common directional control of the steerable nozzle and the aerofins while maintaining the nozzle in a neutral direction when the aerofins are rotated to a missile roll control mode.

24 Claims, 7 Drawing Sheets

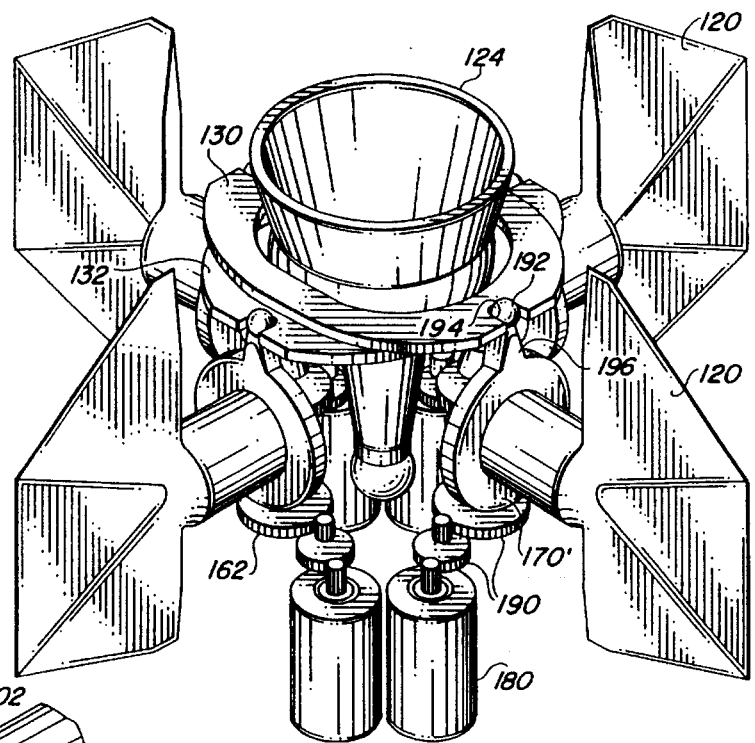
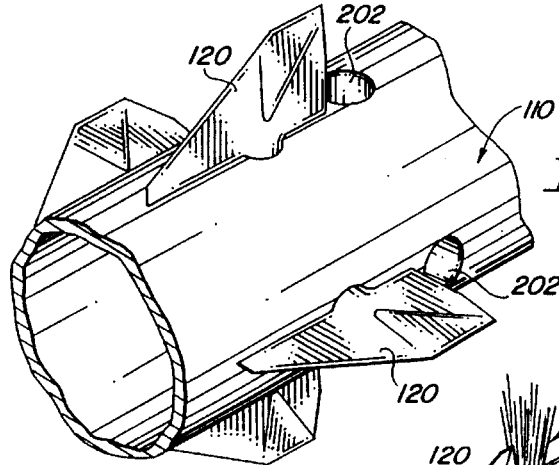
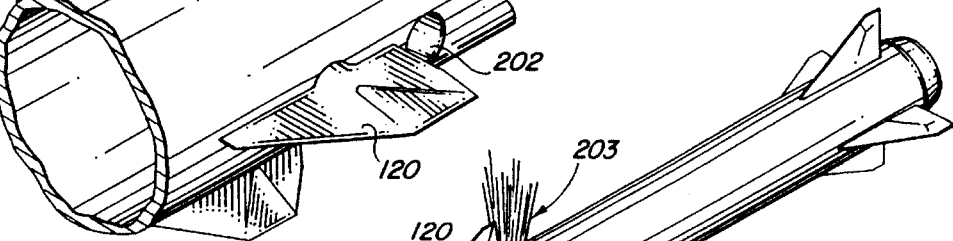
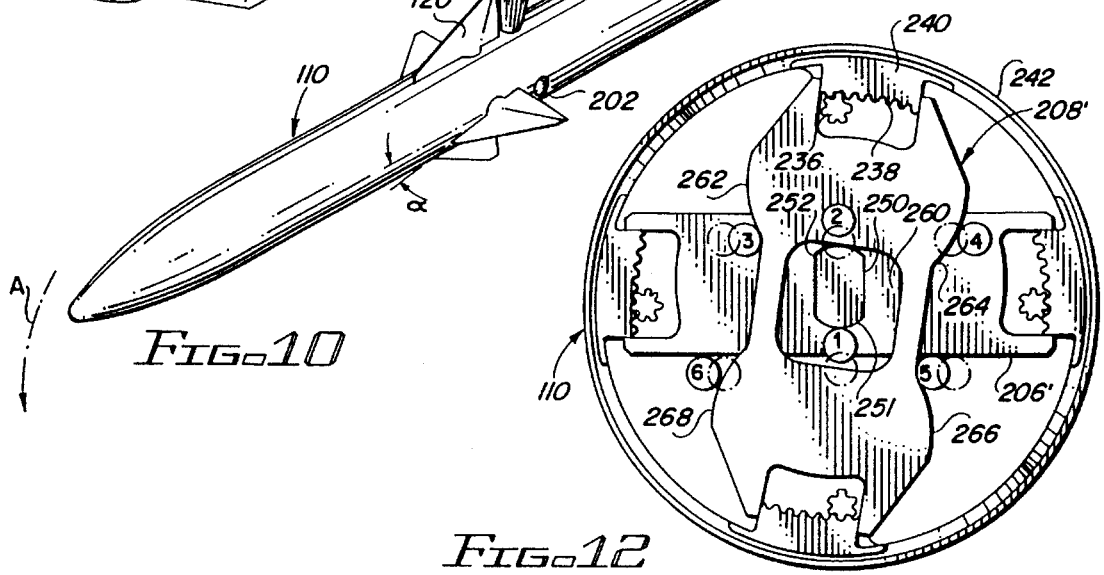

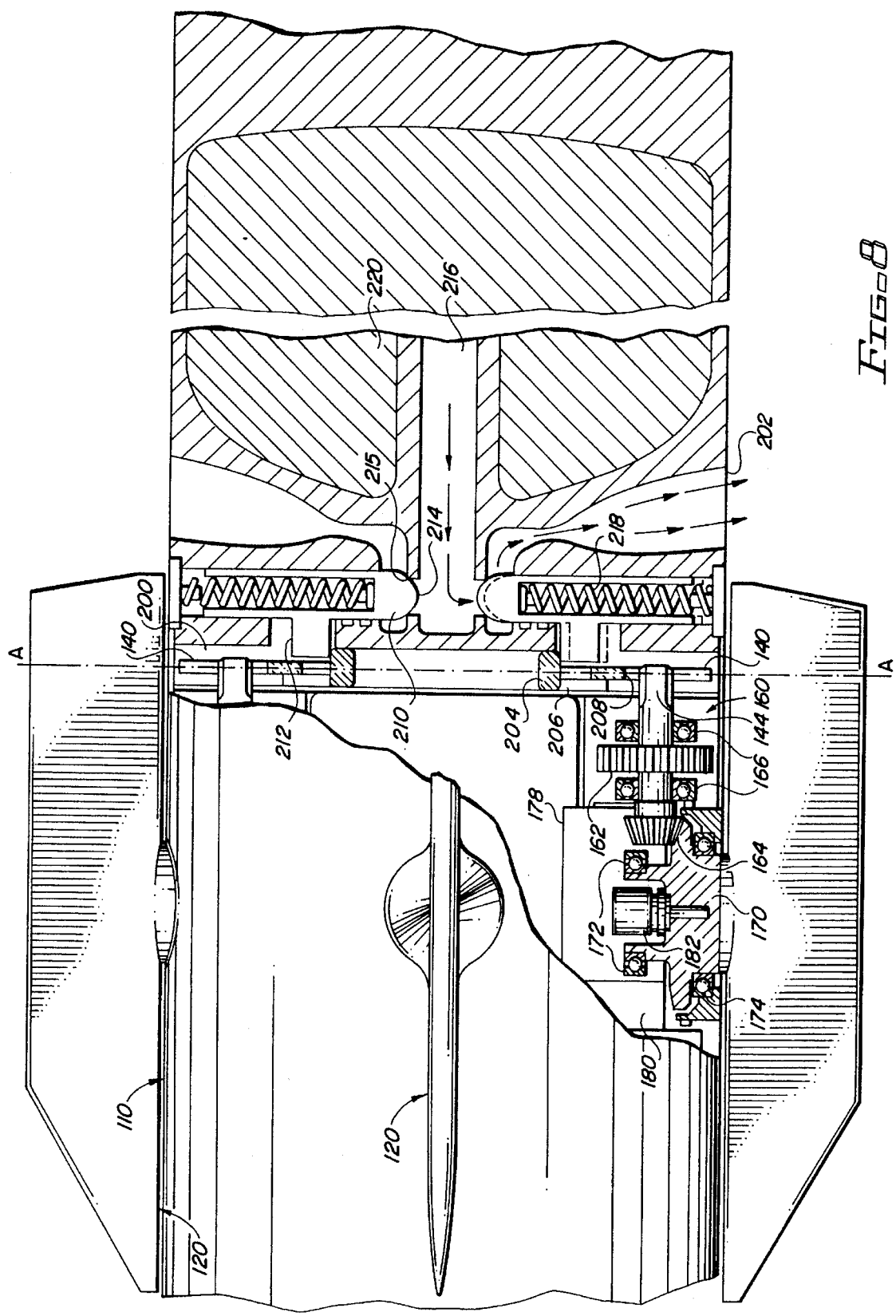

DIFFERENTIAL YOKE-AEROFIN THRUST VECTOR CONTROL SYSTEM

BACKGROUND OF THE INVENTION

1. Field of the Invention

This invention relates to rocket propelled vehicles such as missiles and, more particularly, to arrangements for steering such vehicles by a combination of thrust direction and steering fin control.

2. Description of Related Art

As military aircraft become faster and more maneuverable, there is increased need for faster and more maneuverable missiles with longer ranges to counter these threats. One method of increasing maneuverability of a missile is to use a steerable nozzle on the rocket motor to allow the direction of thrust to be controlled. This affords greater maneuverability than traditional movable aerodynamic fins alone can provide under low speed or very high altitude conditions when the dynamic pressure is low. The mechanism used to move the steerable nozzle is known as the nozzle actuator system. The nozzle actuator system usually is located around the nozzle and infringes on the volume one would like to fill with rocket fuel. If the overall dimensions of the rocket motor are fixed, the smaller the nozzle actuator, the more the room that is available for fuel. Thus, smaller nozzle actuators give the missile greater range.

A simplified actuation system for controlling a steerable missile nozzle is disclosed in U.S. Pat. No. 4,892,253 of John M. Speicher and Allan A. Voigt, two of the inventors herein. That system utilizes a pair of orthogonally oriented, elongated yoke plates which are actuated in unison to control the direction of a gimballed nozzle. The disclosure of U.S. Pat. No. 4,892,253 is incorporated herein by reference.

Nozzle actuators and similar steering systems for missiles and the like have been built, based on hydraulic, pneumatic and electromechanical control systems. For example, Pollak in U.S. Pat. No. 2,850,977 discloses a gimballed power plant in a jet propelled aircraft in which exhaust gases from the rocket propulsion motor are utilized to adjust the rocket motor axis relative to the flight axis of the aircraft by having gyro-operated rotatable fins positioned in the exhaust gas stream. Adjustment of these fins by the aerodynamic forces impinging on them causes movement of the propulsion motor relative to the vehicle axis.

The Tolson U.S. Pat. No. 3,200,587 describes a number of structural arrangements for shifting a rocket engine exhaust nozzle to shift the thrust axis from a position coincident with the central axis of the vehicle to various positions where it is laterally displaced from the central axis. Movement of the thrust axis from the center of gravity or vehicle axis applies torque to the vehicle to effect directional change.

The Kuhn, Jr. U.S. Pat. No. 3,073,630 discloses a particular design of rocket engine gimbal which is provided to control the thrust direction of a rocket engine, relative to a missile body, by pivoting the exhaust nozzle in the gimbal.

Other schemes using steerable propulsion systems for exhaust jet propulsion systems are disclosed in U.S. Pat. No. 3,237,890 of Thielman, U.S. Pat. No. 2,919,544 of Smith, Jr. et al, U.S. Pat. No. 3,908,908 of Johnson, U.S. Pat. No. 3,188,024 of Schneider, U.S. Pat. No. 2,704,331 of Stott et al, U.S. Pat. No. 3,142,153 of Hensley, U.S. Pat. No. 3,147,591 of McEwen, U.S. Pat. No. 3,659,423 of Lair et al, U.S. Pat. No. 4,281,795 of Schweikl, and U.S. Pat. No. 4,350,297 of Martin.

In the development of modern nozzle actuators for controlling steerable exhaust nozzles, electromechanical systems have become dominant because of their improved effectiveness, reliability and reduced weight. Electromechanical nozzle actuators conventionally involve motors and some type of speed reducer to transform the high speed, low torque motor motion into high torque, low speed nozzle motion. Extension of nozzle actuator systems to provide control of aerodynamic steering fins as well would further improve the performance, efficiency, and cost effectiveness of such missile control systems.

SUMMARY OF THE INVENTION

In brief, nozzle actuation systems in accordance with the present invention comprise two conceptually identical nozzle actuators mounted for independently controlling nozzle movement in two orthogonal planes intersecting at the central axis of the rocket motor. Each actuator mechanism comprises an elongated yoke plate having an elongated central opening through which the movable nozzle extends. Each end of the yoke plate is coupled through a rack and pinion gear set to an electric drive motor. Thus there are four section gear sets coupled respectively to four electric motors located at 90 degree intervals about the missile longitudinal axis.

The spur gear pinion of the rack and pinion gear set is part of a combined aerofin and thrust vector control (TVC) dual pinion gear which includes, in addition, a bevel pinion coupled in a drive arrangement to an associated aerofin. The bevel pinion drives a bevel gear which is directly connected to the control aerofin, thus providing aerofin control. In addition, the bevel gear directly drives a combined aerofin and TVC feedback transducer which provides position data for the individual control system. The bevel gear pinion has a spur gear pinion cut onto the same shaft with the spur gear providing the mechanical drive to the yoke plate actuator. The spur gear pinion, sometimes referred to as a yoke drive pinion, drives an internal-toothed missile rack gear. When the missile rack gear is driven to one side or the other, it drives the yoke plate with it.

The system as thus described is repeated in four positions within the missile volume, thus providing four aerofin control axes and the two-axes omni-directional TVC. The direct linkage system between the aerofins and the TVC causes the thrust and the aerofins to assist each other in changing the direction of the missile. When the aerofins go into a roll mode (i.e., the aerofins diametrically opposite to each other rotate in opposite directions), the motions in the respectively linked yoke drive gears cancel each other out. In other words, the yoke plate at the affected aerofin actuator opposed pair merely rotates around the nozzle without moving the nozzle. This allows the missile to control roll without thrust vector nozzle motion and is a particularly beneficial aspect of the present invention which provides significant advantages in the design.

The system has very low volume for this enhanced performance by virtue of the fact that the yoke plate TVC and the aerofin control and drive assembly are combined. This combined control system uses only the same number of drive motors as in a more conventional four-axis aerofin actuator. The combining of what are conventionally two separate and distinct systems reduces the number of drive motors customarily required, thereby also permitting the elimination of a considerable number of supporting electronics and electromechanical components with a resultant weight reduction. Low volume implies an overall low weight for the system, thereby making the design of the present invention highly competitive with other designs because volume and weight are critical items in missile design.

A further benefit is the reduction of fabrication costs, resulting from the overall reduction in the number of parts in the system. A number of expensive electronic components are eliminated from corresponding designs of more conventional systems. Several individual components which are employed perform dual functions, in effect, because they serve the same function with respect to both the aerofin control system and the TVC system.

In addition to the reduction in cost, the reduction in the number of required components provides for improved reliability. With a limited number of moving parts incorporated in the design, there are fewer parts to fail. Reliability is also improved as a result of the replacement of certain electronic components commonly used in conventional systems with simple, highly reliable mechanical parts.

BRIEF DESCRIPTION OF THE DRAWINGS

A better understanding of the present invention may be realized from a consideration of the following detailed description, taken in conjunction with the accompanying drawing in which:

FIG. 7 is a schematic diagram illustrating an alternative embodiment of the present invention;

FIG. 8 is a schematic view like that of FIG. 5 but showing the arrangement adapted to a different preferred embodiment;

FIG. 9 is a partial view of the exterior of a missile incorporating the embodiment of FIG. 8 and depicting essentially the same portion shown in FIG. 8;

FIG. 10 is an operational view of a missile incorporating the embodiment of FIGS. 8 and 9;

FIG. 12 is a schematic end view illustrating the operation of the arrangement of FIG. 11;

DESCRIPTION OF THE PREFERRED EMBODIMENTS

Figure 1:
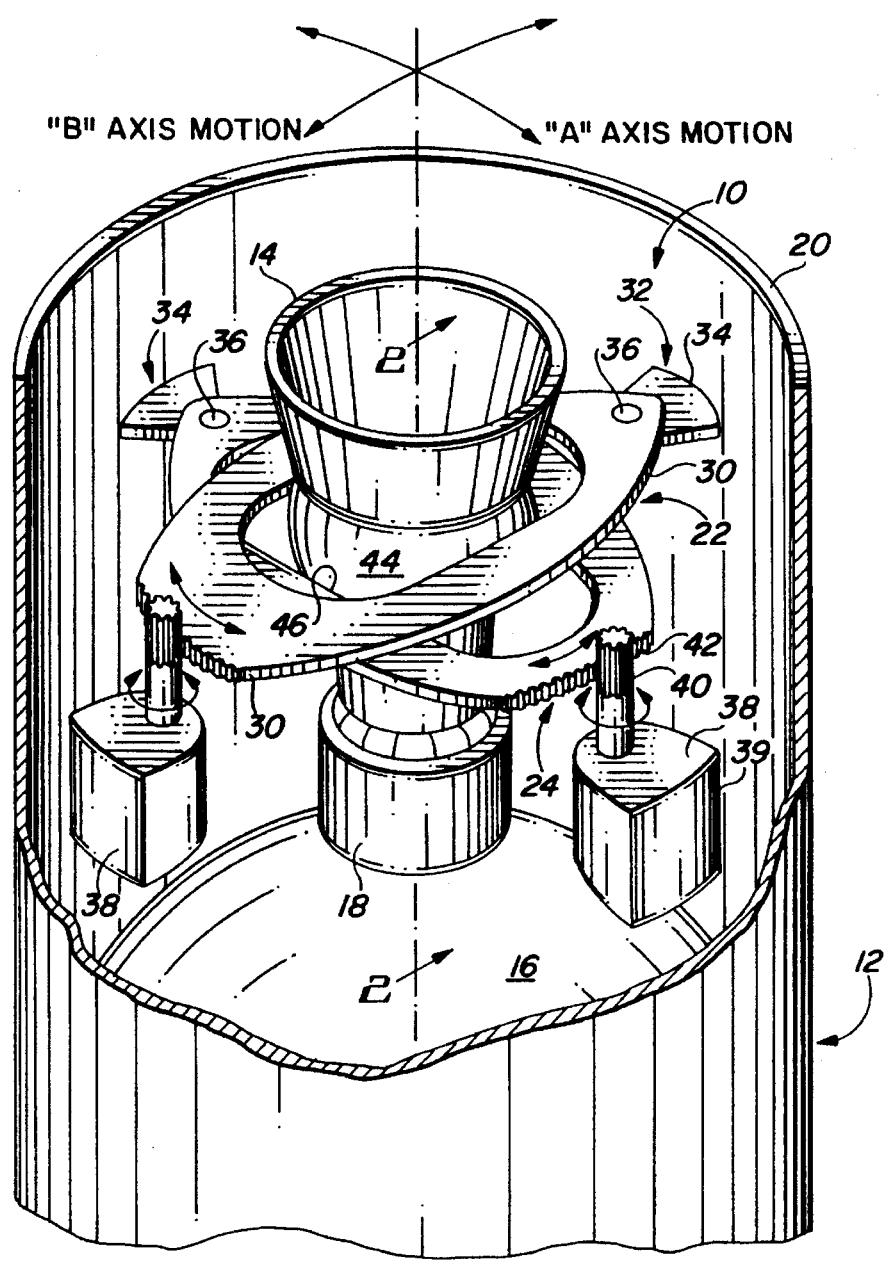
FIG. 1 is a schematic perspective view, partially broken away, illustrating one particular prior art arrangement.
Figure 2:
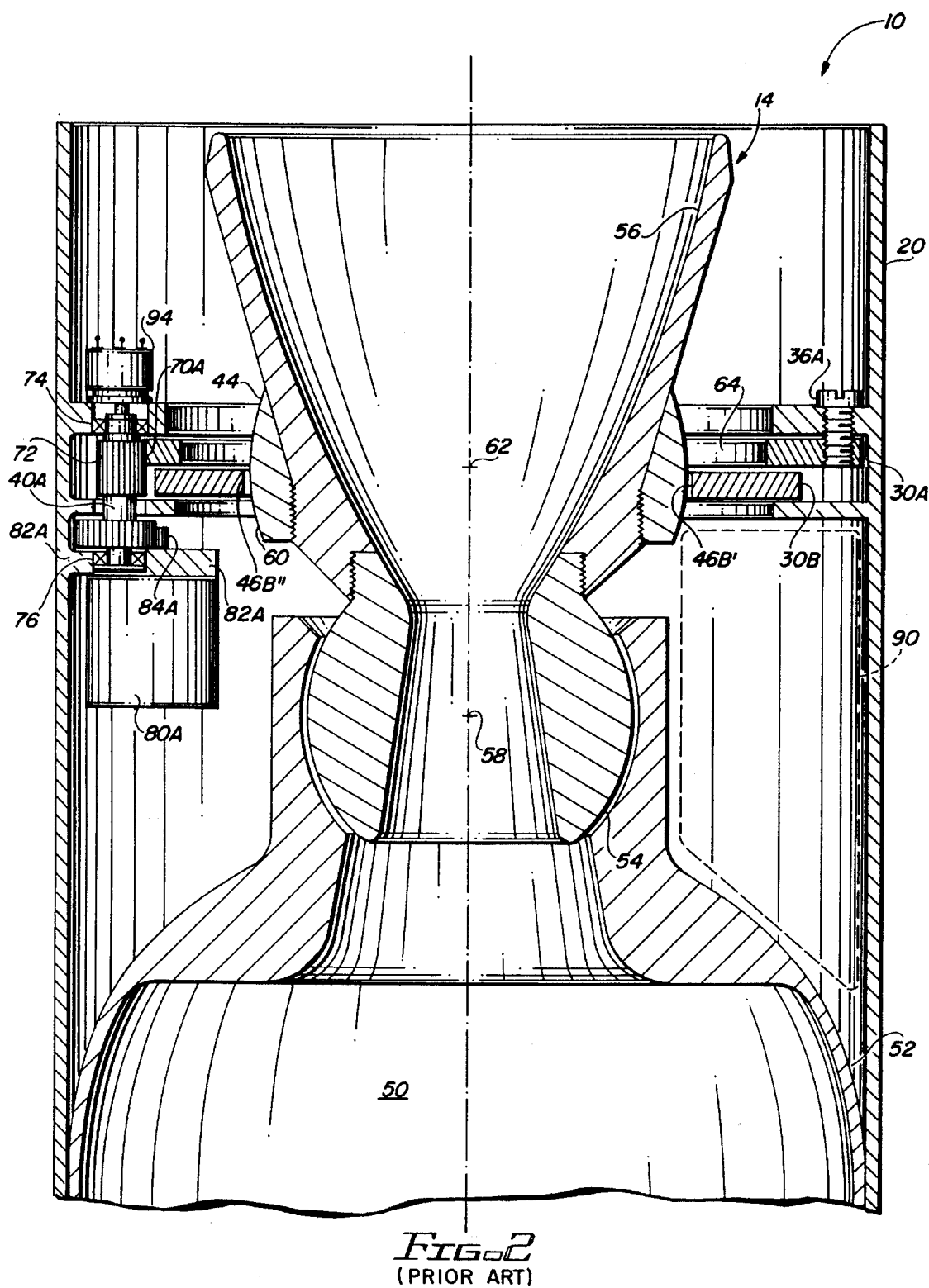
FIG. 2 is a side-sectional view of the arrangement of 2 FIG. 1, taken along line 2—2 thereof and showing certain structural details.

Prior Art Device (FIGS. 1 and 2).

FIGS. 1 and 2 are taken from the aforementioned U.S. Pat. No. 4,892,253 of Speicher and Voigt. These views are included to illustrate the general layout of an arrangement similar to the present invention utilizing two gears driving a pair of orthogonally oriented yoke plates, each of which is pivotably anchored to a fixed support. Arrangements in accordance with the present invention utilize a similar but different pair of yoke plates and a thrust vector control (TVC) system in conjunction with an aerofin control system for enhanced control and maneuverability of an associated missile.

As shown particularly in the schematic view of the prior art arrangement of FIG. 1, the nozzle actuation system 10 is shown in conjunction with a missile 12 having a steerable nozzle 14 mounted to a rocket motor 16 via a ball and socket joint 18, and an encompassing skin 20 which is partially broken away to show details of the steering arrangement therein. The nozzle actuation system 10 comprises a pair of nozzle actuators 22, 24 which are oriented orthogonally from each other in adjacent planes which are generally transverse to the missile central axis to effect steering of the nozzle 14 relative to two orthogonal "A" and "B" axes, respectively. Thus, the actuator system 10 is able to drive the nozzle 14 about the two orthogonal axes A and B for omni-directional steering.

Each of the individual actuators 22, 24 includes a yoke plate 30 and anchoring means at opposite ends of the yoke plate for anchoring the actuator to the missile skin 20. At one end of each yoke plate 30, the anchoring assembly 32 comprises an anchor 34 which is affixed to the inner surface of the skin 20 and serves as a pivot mount for the yoke plate 30 via a pivot pin 36.

At the opposite end of each yoke plate 30, the anchoring arrangement comprises a gear motor 38 contained in a housing 39 which is affixed to the inner surface of the skin 20. Projecting from the housing 39 is a shaft gear 40 which is adapted to engage the adjacent end of the yoke 30 which is fashioned with gear teeth comprising part of a sector gear 42.

Completing the actuation system 10 of FIG. 1 is a yoke seat 44 which is mounted circumferentially about the nozzle 14 within the openings of the elongated yoke plates 30. The yoke seat 44 is formed as a segment of a sphere to provide sliding contact points, such as at 46, to support the bearing loads generated by the yoke plates 30. The seat 44 is spherically cut and has a center on the nozzle center line at a point approximately in line with the central plane between the two yoke plates 30.

Each yoke plate has an elongated central opening defined by two arms which extend about the nozzle. These arms have bearing surfaces adjacent the nozzle yoke seat for transmitting lateral forces to the nozzle 14 while permitting sliding contact with the yoke seat 44.

FIG. 2 illustrates particular structural details of the nozzle system 10 of FIG. 1. A generic rocket motor is pictured having a pressure vessel volume 50 and an aft closure 52 which contains the socket for a spherical ball and socket pivot 54. The nozzle exit cone 56 of nozzle 14 is attached to the ball portion of the pivot 54 such that the exit cone 56 is constrained to rotate with three degrees of freedom about a point 58 in the center of the ball and socket pivot 54.

The spherically cut surface 60 of yoke seat 44 is threadably mounted to the outside of the nozzle 14. The surface 60 affords a suitably strong seat for contact with the two yoke plates 30A, 30B at four points. Two of these points are indicated at 46B' and 46B" in FIG. 2 for the yoke plate 30B. The yoke seat 44 is spherically cut about a point 62 located along the center line of the exit cone 56 and nominally on a plane midway between the two yoke plates 30A, 30B. Forces transmitted through the points of contact between the yoke plates 30A and 30B and the yoke seat 44 generate torque which drives rotation of the nozzle 14 about the A and B axes.

The A-axis actuator 22 comprises yoke plate 30A which is attached to the missile skin structure 20 through a pivot pin 36A. The yoke plates 30A, 30B are constrained to move in planes about their respective pivot pins 36 by the surrounding structure—i.e., the skin structure 20 fore and aft—as they are driven by the gear motor arrangement 38. Each yoke plate 30A, 30B contains an elongated slot 64A or 64B. The yoke seat 44 lies within the slots 64A, 64B and makes contact at two points on opposite sides of each of the yoke plates 30A, 30B. The slots 64A, 64B and seat 44 are cut for a slight clearance, so that the yoke plates 30A, 30B are not actually in contact with the seat at both contact points at the same time, but rather will contact one point or the other depending upon the direction of applied forces. Each yoke plate 30A, 30B has gear teeth 70A or 70B cut into the plate at one end to establish a sector gear portion which is driven by a cluster shaft pinion 72 (FIG. 1). The cluster shaft is mounted by bearings 74, 76 to the missile skin structure 20. The A-axis drive motor 80A is mounted on tabs 82A of the missile skin structure 20. The motor shaft pinion 84A drives the cluster shaft 40A. Clearance slots are cut into the yoke plates 30A, 30B to allow long rotation of the yoke plates without interference from the other axes cluster pinions 72.

The B-axis drive is essentially identical to the A-axis drive. The B-axis yoke plate 30B is positioned next to, but in front of, the A-axis yoke plate 30A. Its pivot pin 36B is similarly attached to the missile structure 20, and yoke plate 30B has sector gear teeth 70B driven by an engaged pinion 72B on shaft 73B.

First Preferred Embodiment (FIGS. 3–6).

Figure 3:
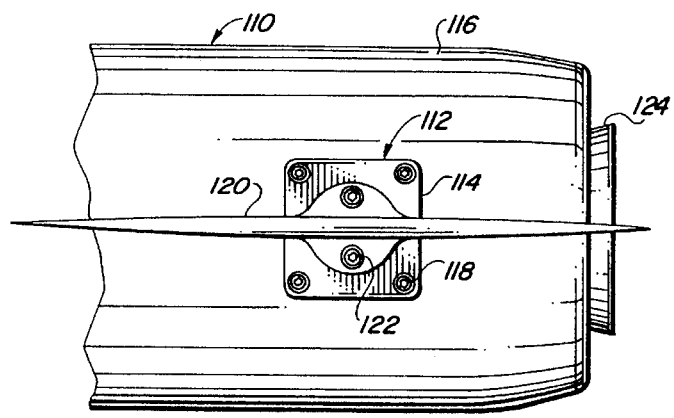
FIG. 3 is a schematic view showing the mounting of a single aerofin on a missile housing.

FIG. 3 is a schematic diagram representing a missile 110 with an aerofin assembly 112 installed thereon. The assembly 112 comprises an aerofin 120 pivotably installed on a base plate 114 which is secured to the skin 116 of the missile 110 by means of mounting bolts 118. The aerofin 120 is affixed to an internal drive mechanism by mounting bolts 122. The exhaust nozzle of the missile 110 is represented schematically at 124. The pivotable mounting of the nozzle 124 corresponds to that which is shown in FIGS. 1 and 2.

Figure 4:
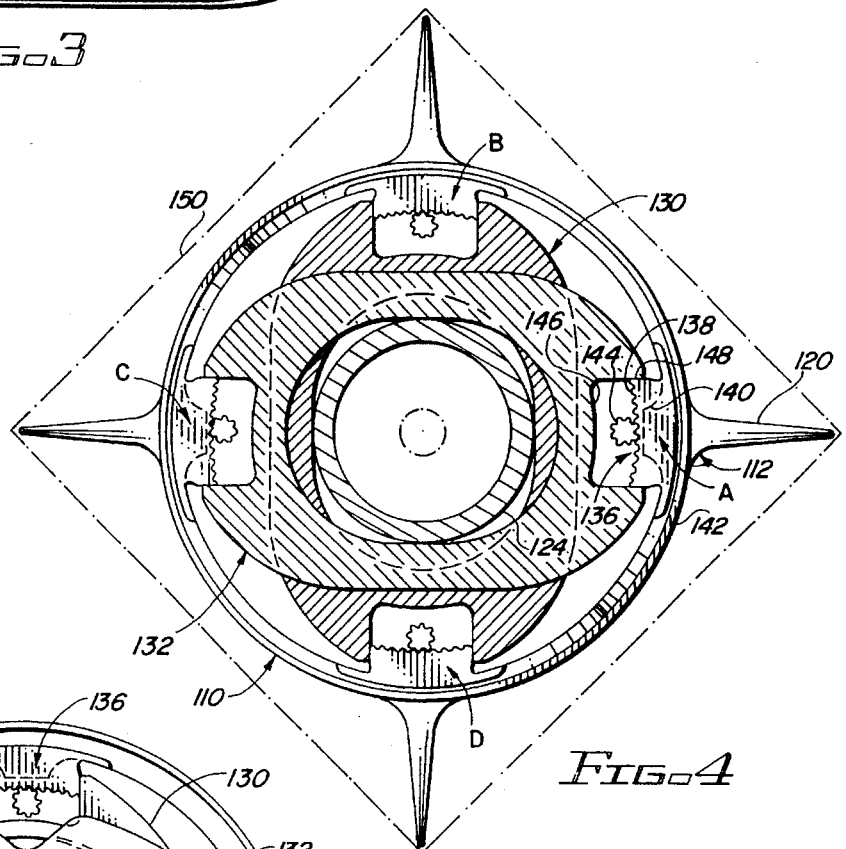
FIG. 4 is a schematic cross-sectional view showing the general orientation of aerofins and yoke plates in a typical arrangement in accordance with the present invention.
Figure 5:
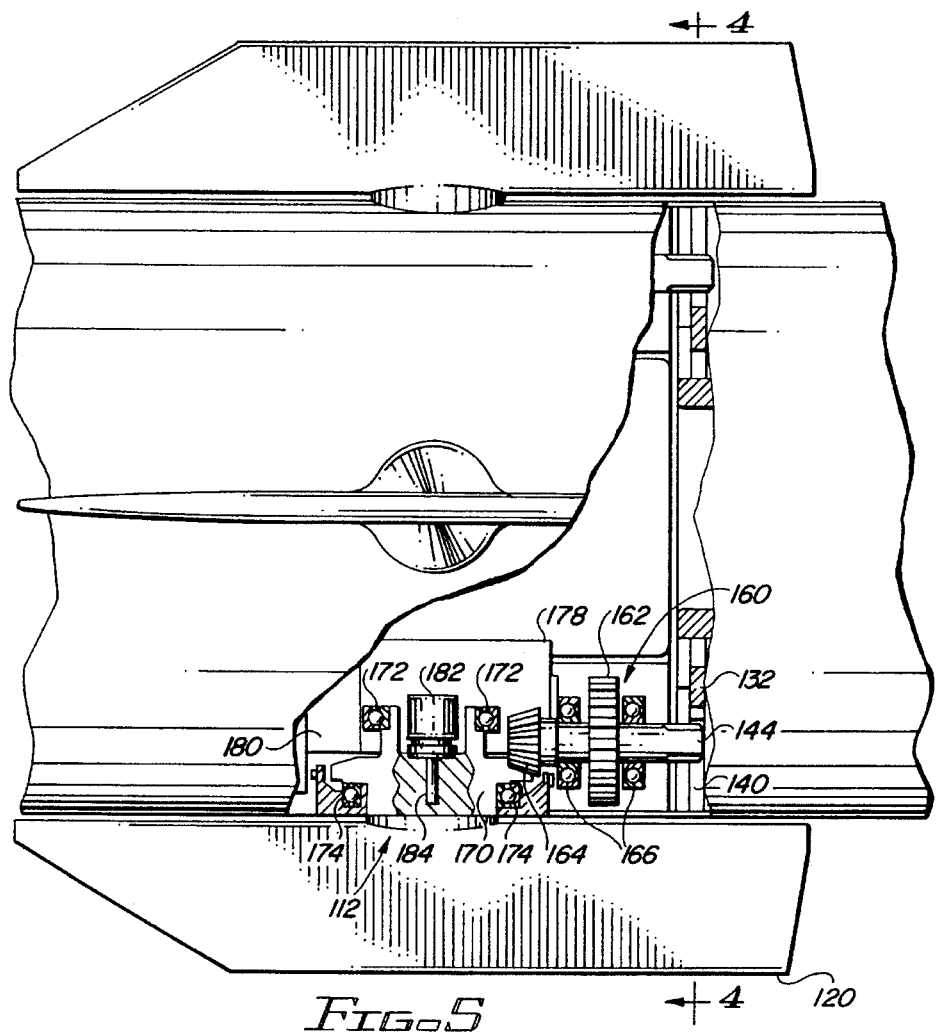
FIG. 5 is a schematic side view, partially broken away, showing some of the details of the internal drive mechanism employed in arrangements such as FIG. 4.

FIG. 4 is a schematic diagram illustrating the drive elements of the combination steering control system 100 of the present invention and corresponds to a sectional view taken along the line 4—4 in FIG. 5, looking in the direction of the arrows. A pair of orthogonally oriented yoke plates 130, 132 are shown bearing against the steerable nozzle 124 to control thrust direction in a manner similar to that of the prior art arrangement depicted in FIGS. 1 and 2. A principal difference from that device is that each of the yoke plates 130, 132 is free to move in response to rotational forces applied at both opposite ends thereof, rather than being pivotably anchored at one end as indicated in FIG. 1.

The details of the yoke plate drive assemblies are shown for the unit A at the position of the aerofin assembly 112. A rack and pinion gear assembly 136 comprises a curved rack gear 138 on a rack carrier 140. The carrier 140 is curved on its outer surface to match the curvature of the missile shell 142 and is adapted to slide circumferentially relative to the missile shell 142 as it is driven by the spur or pinion gear 144. The corresponding end of the yoke plate 132 is provided with a U-shaped recess 146 in which the rack carrier 140 is mounted, bearing against side walls 148 of the recess 146. This arrangement is repeated at the other three aerofin stations B, C and D located at 90 degree spacings about the missile.

In FIG. 4, the broken line outline 150 indicates the typical launcher envelope for such a system. It will be apparent that, as the pinion gear 144 is driven to rotate, it moves the rack carrier 140 either clockwise or counterclockwise, depending upon the direction of rotation of the pinion gear 144. Corresponding movement of the yoke plate 132 moves the nozzle 124 off axis, thereby changing the direction of the thrust to effect steering of the missile. FIG. 5 illustrates schematically the details of the combination drive arrangement for an aerofin 112 and a yoke plate 132 in accordance with the invention. This view shows the combined aerofin and TVC dual pinion gear 160 having a central drive gear 162 mounted on a common shaft with pinion gear 144 and a bevel pinion gear 164. The shaft of the dual pinion gear 160 is mounted in bearings 166.

A bevel gear 170 is directly connected to the aerofin 120 and is coupled to the bevel pinion gear 164. Gear 170 is mounted for rotation in upper and lower bearings 172, 174. An electric motor 180 has an output shaft coupled to drive the gear 162 which in turn produces rotation of both the bevel gear 170 and the pinion gear 144, thus driving both the aerofin 120 and the rack 140. This in turn drives the yoke plate 132. A feedback transducer 182 is connected to the aerofin bevel gear 170 by a shaft 184, thereby providing aerofin position data for the control system of the drive arrangement 100. The coupling between the motor 180 and the gear 162 is represented by the block 178. This preferably incorporates a speed reducing gear train to transform the motor's relatively high speed and low torque into low speed and high torque. Such speed reducers are known in the art; details are omitted from FIG. 5 for simplicity.

Figure 6A:
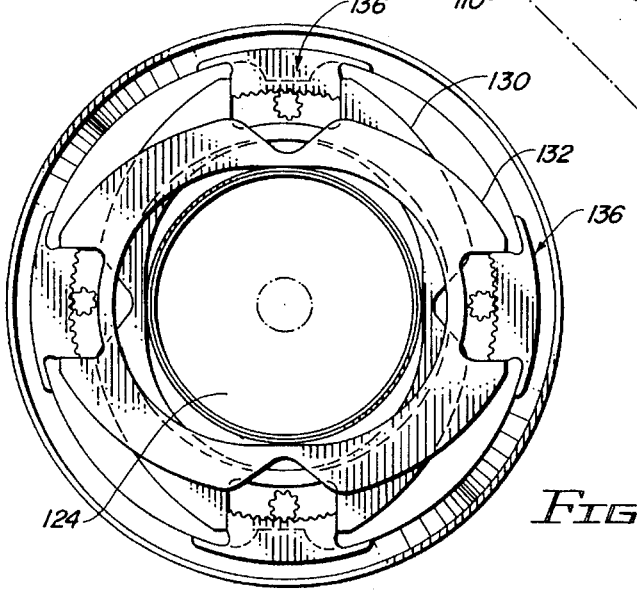
FIGS. 6A and 6B are schematic end views depicting the orientation of the yoke plates to different positions of the associated drive gears.
Figure 6B:
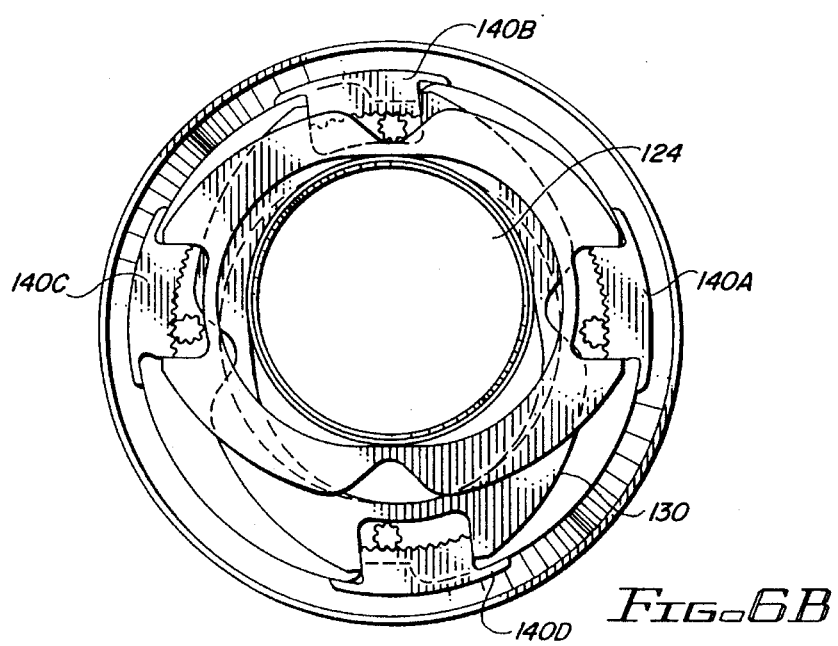

FIG. 6A is a schematic diagram, like that of FIG. 4, showing the rack and pinion drive arrangement and the corresponding yoke plates 130, 132 with nozzle 124 in neutral position. FIG. 6B is a similar view showing the racks driven to their extreme positions. Rack carriers 140A and 140C have been driven upward, thereby directing the nozzle 124 off axis to an upper position. Similarly, the aerofins 120 at positions A and C (see FIG. 4) would be rotated correspondingly to drive the missile in the same direction of flight as results from the shifting of the nozzle 124. The rack carriers 140B, 140D, however, are shown driven in opposite directions from each other; that is, the rack carrier 140B is driven to the left while 140D is driven to the right. This condition corresponds to the rotation of the aerofins at stations B and D (FIG. 4) in opposite directions, which would produce a roll motion of the missile. Moving the corresponding rack carriers 140B and 140D as shown results in the nozzle 124 being unaffected, since the yoke plate 130 does not move off axis as the rack carriers 140B and 140D are moved; the yoke plate 130 merely rotates with the rack carriers 140B, 140D. Thus, missile roll maneuvers can be effected without shifting the nozzle off center. However, when the aerofins are driven to change the direction of the missile relative to its flight trajectory, the arrangement of the present invention also produces a corresponding shift of the nozzle direction to direct the thrust in accordance with the shift of the aerofins.

Second Preferred Embodiment (FIG. 7).

FIG. 7 is a schematic representation of an alternative arrangement in accordance with the present invention incorporating a steerable nozzle 124 positioned to be steered by yoke plates 130, 132 in the manner already described. FIG. 7 also shows a plurality of aerofins 120 coupled into a bevel gear 170' which is driven by a gearing arrangement 190 from an electric motor 180. The arrangement 190 develops the desired speed reduction with torque multiplication mentioned hereinabove. Instead of the rack and pinion gear arrangement of the embodiment of FIGS. 4–6, however, the drive to the yoke plates 130, 132 is effected by means of a ball 192 mounted within a U-shaped socket 194 at the end of the corresponding yoke plate. The ball 192 is supported from the bevel gear 170 by means of an arm 196. When the gear 170' rotates, the arm 196 moves the ball 192 in a clockwise or counter-clockwise direction in the plane of the gear 170', as viewed along the axis of the gear, thereby producing corresponding movement of the associated end of the yoke plate 130. The operation of each of the other three aerofin/yoke plate drive assemblies is the same and the result is similar to the operation of the steering system described in connection with FIGS. 6A and 6B which is equivalent to the arrangement of FIG. 7.

Third Preferred Embodiment (FIGS. 8–10).

A combination aerofin and jet reaction control (JRC) missile steering system is represented schematically in FIGS. 8–10. FIG. 8 shows an actuator assembly like that depicted in FIG. 5, except that here the actuator assembly is operative to control an associated auxiliary jet steering system in place of the thrust vector control system for the main nozzle as previously described.

The actuator assembly portion of FIG. 8 to the left of the broken line A—A is the same as that shown in FIG. 5 and the same reference numerals are used to identify like elements. It should be clear, of course, that there are four of the assemblies like the one depicted at the bottom of FIG. 8, one for each of four fins 120 mounted at 90 degree angles about the missile 110.

The jet reaction control portion of the arrangement of FIG. 8 is shown comprising a JRC housing 200 mounted just aft of the yoke plates 206, 208 which are positioned to control the movement of the valve control puck 204. These elements correspond to or are equivalent in operation to the yoke plates 130, 132 and the steerable nozzle 124 in the FIG. 4 representation of the first preferred embodiment, described hereinabove.

The housing 200 encompasses four rocket nozzles 202 and four associated rocket valves 210 situated about a central pressure inlet 216 from a rocket motor or other pressure source 220. These rocket nozzles and valves may be oriented to exhaust directly behind the aerofins 120, as indicated in FIG. 8, or they may be angularly displaced therefrom as desired, for example, displaced by 45 degrees so that the nozzles exhaust midway between the aerofins 20.

Each valve 210 is generally cylindrical with a bullet nose 214 bearing against a valve seat 215. The valve 210 is hollow and contains a spring 218 therein for urging nose 214 of the valve 210 against the seat 215 to close off the associated passage from the pressure inlet 216 to a corresponding nozzle 202. To one side of the valve 210 is a valve arm 212 which bears against the outer surface of the valve control puck 204. Thus as the puck 204 is moved off the central axis of the missile by the actuator assembly, as previously described, it drives one or another of the valve arms 212 and associated valve 210 radially outward, thereby drawing the nose 214 away from the seat 215 to a valve-open position, as indicated in the broken line of the lower valve in FIG. 8, so that gas from the pressure inlet 216 connects through that valve passage to the bottom nozzle 202 in FIG. 8.

The effect of opening one of the valves 210 in this manner is illustrated in FIGS. 9 and 10. FIG. 9 shows a portion of a missile body with aerofins 120 and a nozzles 202 mounted directly behind the aerofins. The operation of this system is represented at FIG. 10 where the potion of FIG. 9 is shown installed on the missile as a canard system. The aerofins 120 are shown rotated to cause a force pushing the nose of the missile 110 down. Similarly, the exhaust 203 from the nozzle 202 in the uppermost position is to the same effect, driving the nose of the missile downward to produce a directional change indicated by the arrow A.

Fourth Preferred Embodiment (FIGS. 11–15).

Figure 11:
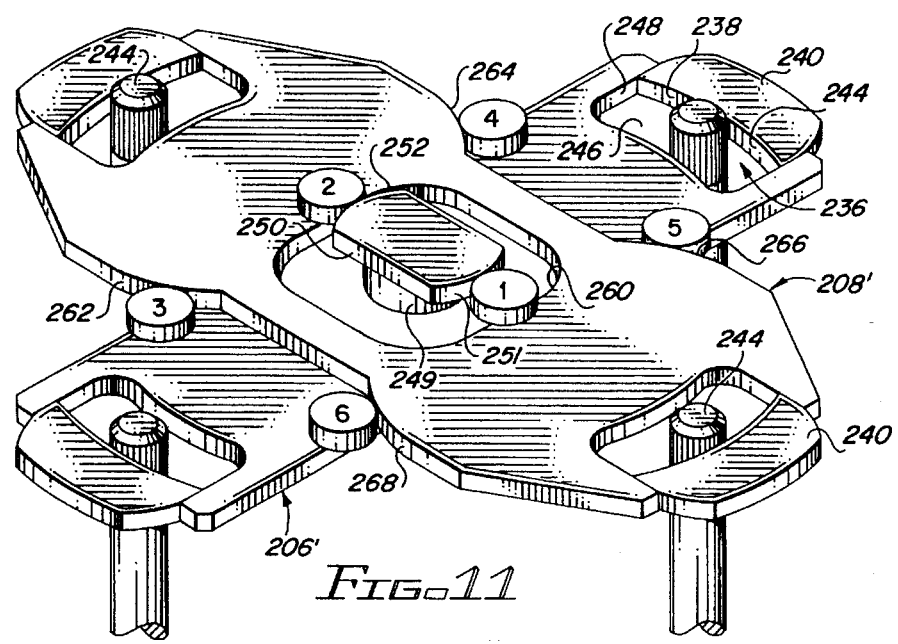
FIG. 11 is a schematic perspective view showing the salient elements of still another embodiment of the invention.
Figure 13:
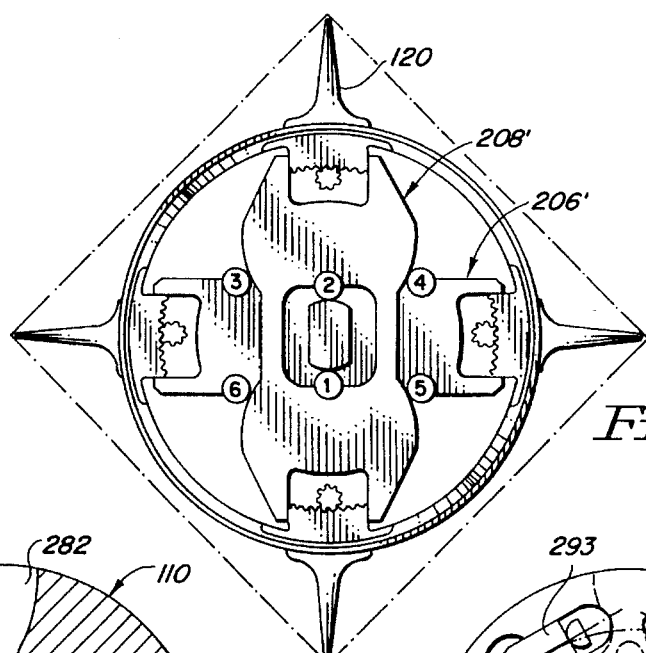
FIG. 13 is another schematic end view of the FIG. 11 embodiment, like the view of FIG. 4.

It will be understood that the elements shown in FIGS. 11, 12 and 13 are part of a steering rocket control system much like that shown in FIGS. 8–10. The principal difference is that, whereas four steering rockets are shown in the embodiment of FIGS. 8–10, this embodiment involves the use of six steering nozzles and provides the added advantage that the nozzles can augment the aerofins controlling roll as well as yaw and pitch. In addition, the yoke plates are of different shape, and control of the valves for activating the selected nozzles is effected by camming surfaces and cam followers instead of the valve control puck 204 in the arrangement of FIG. 8.

FIGS. 11–13 depict a forward yoke plate 206' and aft yoke plate 208' having respective opposite ends with generally U-shaped recesses 246. A rack and pinion gear assembly 236 comprises a curved rack gear 238 on a rack carrier 240. The carrier 240 is curved on its outer surface to match the curvature of the missile shell 242 and is adapted to slide circumferentially relative to the missile shell 242 as it is driven by the spur gear 244. The corresponding end of the yoke plate, 206' or 208', is provided with a U-shaped recess 246 in which the rack carrier 240 is mounted, bearing against side walls 248 of the recess 246. The same arrangement is present at each end of each of the yoke plates 206', 208'. It will be seen that the plane formed by the intersecting broken lines in FIG. 11 is approximately at the position of the broken line A—A of FIG. 8.

The forward yoke plate 206' has a pair of arcuate cam surfaces 251, 252 on a cam plate 250 which is offset from the yoke plate 206' by a mounting pedestal 249. The position of the cam plate 250 is behind the aft yoke plate 208' and projects through a central opening 260 in the yoke plate 208'. The yoke plate 208' also has arcuate cam surfaces 262, 264, 266 and 268 shaped and positioned as shown on opposite sides of the respective yoke plate center lines indicated by the long/short dash lines of FIG. 11.

Cam followers bearing numerals 1 and 2 are positioned adjacent cam surfaces 251 and 252, respectively, on the cam plate 250. The opening 260 in the yoke plate 208' is of a size to permit the pedestal 249 bearing the cam plate 250 to move in accordance with movement of the forward yoke plate 206' within the range of movement of the aft yoke plate 208' (see FIG. 12). Cam followers bearing numerals 3, 4, 5 and 6 are positioned adjacent respective cam surfaces 262, 264, 266 and 268 on the aft yoke plate 208'. These are symbolic representations only of the cam followers 1 through 6, which may be roller cams or some other appropriate cam follower elements. As indicated symbolically in FIG. 14, the cam followers 1 through 6 are coupled to valves controlling pressurized gas flow to the respective steering thruster nozzles 281–286. Since the side thrusters 283–286 are in pairs and are mounted off-axis of the missile 110, these nozzles can be effective in controlling roll as well as yaw.

FIG. 13 shows the yoke plates 206', 208' in the neutral position in which the valves to all of the thrusters 281–286 are closed. This neutral or rest position corresponds to the broken line circles shown in FIG. 12. Movement of a cam follower inboard—i.e., toward a corresponding mid-plane of the missile—results in the opening of the corresponding nozzle valve, while moving a cam follower outboard from the neutral position merely maintains the corresponding valve closed. It may be seen from FIG. that movement of the forward yoke plate 206' in the upward direction, without rotation, opens the valve corresponding to the cam follower 1 which directs thrust from the bottom nozzle 281, thereby lifting the nose of the missile 110. On the other hand, rotation of the forward yoke plate 206' without translational movement merely maintains the valves for the nozzles 281, 282 which are controlled by the cam followers 1 and 2, respectively, in the closed position, because of the arcuate shape of the cam surfaces 251, 252.

Figure 14:
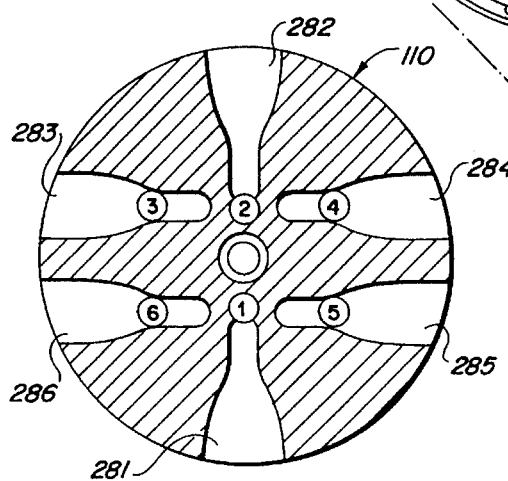
FIG. 14 is a schematic cross-sectional view of jet nozzles associated with the arrangement of FIG. 11.

Rotation of the aft yoke plate 208' as indicated in FIG. 12, results in the opening of the valves corresponding to the cam followers 3 and 5, thereby activating the nozzles 283 and 285 to impart roll motion to the missile 110 (clockwise in the view shown in FIG. 14). Rotation of the yoke plate 208' in the opposite direction opens valves to the nozzles 284 and 286 while closing the valves to nozzles 283, 285, thereby imparting roll motion in the opposite direction. Translation of the yoke plate 208' without rotation results in the opening of valves to the nozzles on one side or the other of the missile to control yaw. As previously indicated, this movement of the yoke plates 206', 208' is in conjunction with the rotation of the aerofins 120 so that the effect of pivoting of the aerofins 120 is enhanced by the thrust from corresponding nozzles 281 through 286.

Figure 15:
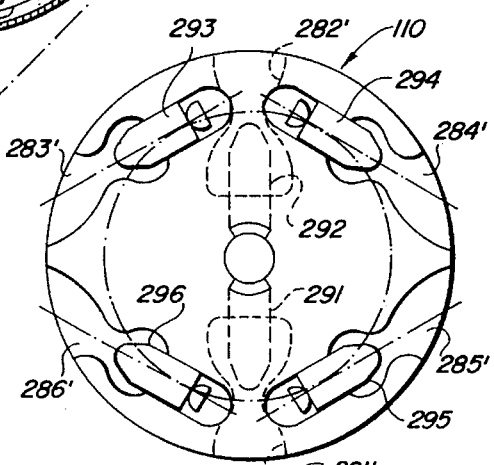
FIG. 15 is a schematic view corresponding to FIG. 14 but showing a variant of the nozzle arrangement for the embodiment of FIG. 11.

FIG. 15 is a schematic view corresponding to FIG. 14 of a variant of the nozzle arrangement represented in FIG. 14. In FIG. 15, the nozzles 281' through 286' correspond to the nozzles 281 through 286 of FIG. 14, except that the pairs of side thrusting nozzles 283' through 286' are mounted in the angles shown in order to develop a more pronounced roll motion when activated. The representations of the nozzle valves in FIG. 15 are designated by reference numerals 291 through 296. It will be understood that these are controlled in the manner described for the valves in the arrangement of FIG. 14.

Thus, an improvement in steering control systems for missiles is provided which results in reduced volume and weight for the control system, thus providing increased range and maneuverability. The integrated control systems of the present invention provide augmentation of aerofin maneuvering control by the addition of either a thrust vector control system or a jet reaction control system, thereby allowing extreme angles of attack during launch intercept maneuvers, even with greatly reduced aerofin surface areas that permit compact internal carriage. Significant cost reduction and improved reliability are achieved by the use of systems in accordance with the invention.

The steering control arrangements in accordance with the present invention effectively couple both nozzle steering or jet reaction steering and aerofin control to a common drive system. Only four electric motors are required, one for each of the four aerofins. These four motors are effective in also controlling the direction of the steerable nozzle or the activation of the steering jets. This combination control of the augmentation steering and the aerofins is achieved within the same missile envelope as was required for the steerable nozzle system of the prior art.

Although there have been shown and described hereinabove specific arrangements of a differential yoke-aerofin thrust vector control system in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the annexed claims.

What is claimed is:

1. An integral aerofin and augmented steering control system for missiles comprising:

at least a pair of movable aerofins mounted on opposite sides of a missile for controlling missile flight;

an electric motor for each of said aerofins connected to be responsive to signals for controlling the missile in flight;

auxiliary steering means for augmenting the steering control effected by the aerofins;

a movable yoke plate mounted transversely within said missile for controlling the auxiliary steering means in accordance with the positions of said aerofins; and a gear train for each electric motor, each gear train having a first group of gears coupling a motor to an associated aerofin and a second group of gears coupled to drive the yoke plate in response to activation of the corresponding electric motor.

2. The steering control system of claim 1 comprising four movable aerofins mounted by pairs on opposite sides of the missile, the first and second pairs being spaced at 90 degrees from each other about the missile shell, an additional electric motor and associated gear train for each aerofin of a second pair, and a second yoke plate mounted transversely within the missile adjacent said first yoke plate and generally orthogonal thereto, said second yoke plate being coupled to the second group of gears of each gear train associated with the second pair of aerofins for controlling the auxiliary steering means in accordance with the positions of the second pair of aerofins.

3. The system of claim 1 wherein the second group of gears of each gear train comprises a rack and pinion gear having a rack gear carrier engaged in a corresponding end of the yoke plate, the carrier having an outer curved surface matching the curvature of the inner surface of the missile shell and being slidable with respect thereto to drive the corresponding end of the yoke plate laterally in accordance with the rotation of the aerofins.

4. The system of claim 3 wherein said yoke plate is formed at each end with an outwardly directed, generally U-shaped recess through which the pinion gear of said rack and pinion gear extends, said rack gear carrier being mounted within said recess in sliding engagement with the sides thereof.

5. The system of claim 2 wherein the auxiliary steering means comprise a pivotable propulsion rocket nozzle of the missile extending through central openings in the yoke plates, the edges of said openings being positioned to bear against the exterior of the rocket nozzle during movement of a selected yoke plate to change the angle of the propulsion rocket nozzle relative to the missile longitudinal axis in accordance with movement of the yoke plate.

6. The system of claim 5 wherein the coupling between the first and second groups of gears of a given pair of gear trains and the associated yoke plate is such that the yoke plate is moved transversely when the aerofins of a pair associated therewith are rotated in the same direction.

7. The system of claim 5 wherein the coupling between the first and second groups of gears of a given pair of gear trains and the associated yoke plate is such that the angle of the pivotable propulsion rocket nozzle relative to the missile axis is changed by the associated yoke plate when both aerofins of the pair associated therewith are pivoted in the same direction in order to augment the effect of the pivoted aerofins in changing the direction of flight of the missile.

8. The system of claim 5 wherein the coupling between the first and second groups of gears of a given pair of gear trains and the associated yoke plate is such that the yoke plate is rotated about the missile axis without transverse movement relative thereto when the aerofins of a corresponding pair are pivoted in opposite directions to each other so as to develop rotation of the missile without affecting the angle of the pivotable propulsion rocket nozzle.

9. The system of claim 5 wherein the coupling between the first and second groups of gears within a given pair of gear trains and the associated yoke plate is such that movement of the yoke plate does not affect the angle of the pivotable propulsion rocket nozzle during pivoting of the corresponding aerofins in a missile roll mode.

10. The system of claim 5 wherein the aerofins are located forward of the propulsion rocket nozzle in a canard position and wherein the auxiliary steering means comprise four side thruster nozzles directed outward through the missile shell and spaced at 90 degrees from each other about the missile, each of the nozzles having a passage communicating with a central source of pressurized gas and a valve to control the flow of gas through said passage, and valve actuating means responsive to movement of a corresponding yoke plate to control the opening or closing of the valve associated therewith in accordance with the position of the yoke plate.

11. The system of claim 10 further including a circular valve control puck extending through central openings in the respective yoke plates, each of said valves having an arm extending therefrom in contact with said puck for actuation thereby when the puck is moved in an off-axis direction relative to the missile axis.

12. The system of claim 11 wherein the coupling between the first and second groups of gears of a given pair of gear trains and the associated yoke plate is such that the yoke plate is moved transversely relative to the missile longitudinal axis by the pivoting of an associated pair of aerofins in the same direction, thereby opening the valve for a nozzle spaced 90 degrees from the pivoting aerofins to augment the effect of the pivoting aerofins in changing the direction of missile flight.

13. The system of claim 11 wherein the coupling between the first and second groups of gears of a given pair of gear trains and the associated yoke plate is such that rotation of an associated pair of aerofins in opposite directions produces rotation of the corresponding yoke plate about the missile axis without transverse movement relative thereto so that the nozzle valves remain closed when the missile is driven in the roll mode.

14. The system of claim 5 wherein the aerofins are located forward of the propulsion rocket nozzle in a canard position and wherein the auxiliary steering means comprise a first set of two side thruster nozzles projecting outwardly through the missile shell on opposite sides of the missile and a second set of four side thruster nozzles projecting outwardly through the missile shell, the second set being grouped in pairs positioned on opposite sides of the missile from each other and displaced by 90 degrees from the nozzles of the first set, the axes of the side thruster nozzles of the second set being aligned so as to avoid intersecting the missile longitudinal axis, the axes of the side thruster nozzles of the first set being aligned so as to intersect the missile longitudinal axis, each of the nozzles having a passage communicating with a central source of pressurized gas and a valve to control the flow of gas through said passage, and valve actuating means responsive to movement of a corresponding yoke plate to control the opening or closing of the valves in accordance with the position of the yoke plate.

15. The system of claim 10 wherein the valve actuating means comprise a plurality of cam surfaces on first and second yoke plates and a corresponding plurality of cam followers coupled to said surfaces.

16. The system of claim 15 wherein a first yoke plate associated with the first set of side thruster nozzles has two cam surfaces, there being two corresponding cam followers associated with said two surfaces and coupled to the valves of the respective nozzles of said first set.

17. The system of claim 16 wherein said two cam surfaces are positioned on a cam plate mounted on a pedestal extending through a central opening in the second yoke plate to offset said cam plate from the plane of the first yoke plate.

18. The system of claim 17 wherein said two cam surfaces are of arcuate shape with constant and equal radius to the center of the yoke plate.

19. The system of claim 15 wherein the second yoke plate is provided with four cam surfaces, four of said plurality of cam followers being individually associated with respective ones of said four cam surfaces and coupled to corresponding valves controlling the nozzles of said second set for selectively activating said nozzles in selected pairs.

20. The system of claim 16 wherein the cam surfaces of the first yoke plate are shaped to cause a selected one of the valves of the nozzles of the first set to open when the first yoke plate is moved transversely by the associated gear train but maintain both valves of the nozzles of the first set closed when the first yoke plate is rotated about the missile axis without transverse movement by the associated gear train.

21. The system of claim 19 wherein each pair of thrusters of the second set is arrayed on opposite sides of a longitudinal plane through the missile longitudinal axis to impart a thrust reaction force from a single nozzle tending to produce rotation of the missile.

22. The system of claim 21 wherein the second yoke plate is effective to activate two nozzles of the second set on one side of the missile when the second yoke plate is moved transversely, corresponding to pivoting of the associated aerofins in the same direction to produce a change in the direction of missile flight.

23. The system of claim 21 wherein the second yoke plate is effective to activate one nozzle of each pair of said second set on opposite sides of said longitudinal plane when the yoke plate is rotated without transverse movement, corresponding to the pivoting of the associated aerofins in opposite directions, thereby causing the activated nozzles to develop a rotational force to augment the roll effect of the pivoted aerofins.

24. The system of claim 2 in which each gear train comprises a rotatable gear shaft mounted to an interior wall of the missile in the vicinity of a corresponding aerofin, a first bevel gear mounted on one end of said shaft, a second bevel gear connected to said aerofin and mounted in a position to engage the first bevel gear for driving the aerofin from said shaft, a first pinion gear mounted at the other end of said shaft as part of a rack and pinion gear for driving an associated yoke plate, a rack carrier positioned between the first pinion gear and the missile shell in sliding engagement with the shell, said carrier having a rack gear with teeth cut along a radially inward surface of the carrier for engagement with said first pinion gear and an arcuate shape along a radially outward surface matching the arcuate shape of the missile shell, a second pinion gear mounted on said shaft between the two ends thereof; and a speed reducing gear set coupling an associated electric motor to drive said second pinion gear and said shaft to develop transverse movement of the rack carrier in conjunction with pivotal rotation of the aerofin.

* * * * *